(12) United States Patent
Schleyen et al.

(10) Patent No.: US 10,101,206 B2
(45) Date of Patent: Oct. 16, 2018

(54) SPECTRAL IMAGING METHOD AND SYSTEM

(71) Applicant: RAMOT AT TEL-AVIV UNIVERSITY LTD., Tel Aviv (IL)

(72) Inventors: Ran Schleyen, Rehovot (IL); Ariel Raz, Givataim (IL); David Mendlovic, Tel Aviv (IL)

(73) Assignee: RAMOT AT TEL-AVI UNIVERSITY LTD., Tel Aviv (IL)

( * ) Notice: Subject to any disclaimer, the term of this patent is extended or adjusted under 35 U.S.C. 154(b) by 39 days.

(21) Appl. No.: 15/524,827

(22) PCT Filed: Nov. 5, 2015

(86) PCT No.: PCT/IL2015/051070
§ 371 (c)(1),
(2) Date: May 5, 2017

(87) PCT Pub. No.: WO2016/071909
PCT Pub. Date: May 12, 2016

(65) Prior Publication Data
US 2018/0252583 A1 Sep. 6, 2018

Related U.S. Application Data

(60) Provisional application No. 62/075,972, filed on Nov. 6, 2014, provisional application No. 62/097,773, filed on Dec. 30, 2014.

(51) Int. Cl.
*G01J 3/28* (2006.01)
*G01J 3/26* (2006.01)
(Continued)

(52) U.S. Cl.
CPC ........... *G01J 3/2823* (2013.01); *G01J 3/0229* (2013.01); *G01J 3/26* (2013.01); *G01J 2003/1243* (2013.01)

(58) Field of Classification Search
CPC ........ G01J 3/02; G01J 3/28; G01J 3/26; G01J 3/44; G01J 3/18; G01J 3/10
See application file for complete search history.

(56) References Cited

U.S. PATENT DOCUMENTS 5,479,258 A 12/1995 Hinnrichs et al.
5,539,518 A 7/1996 Bennett
(Continued)

FOREIGN PATENT DOCUMENTS

CN 102322954 A 1/2012
CN 102466520 A 5/2012
(Continued)

OTHER PUBLICATIONS

Foster, et al., Information limits on neural identification of colored surfaces in natural scenes, Visual Neuroscience, 2004, pp. 331-336, vol. 21(3).
(Continued)

*Primary Examiner* — Abdullahi Nur
(74) *Attorney, Agent, or Firm* — Browdy and Neimark, PLLC

(57) ABSTRACT

An imaging system and method are presents for use in reconstructing spectral data of an object. The imaging system comprises: an optical unit; a pixel array of a detector; and a data processor for receiving and processing image data indicative of light detected by the pixel array and generating reconstructed spectral data of the object being imaged. The optical unit is configured and operable for applying a predetermined coding to an input light field while creating an optical image thereof on a detection plane defined by the pixel array. Therefore, the image data is a function of the predetermined coding and a spectrum of the object to be determined.

20 Claims, 7 Drawing Sheets

(51) Int. Cl.
*G01J 3/02* (2006.01)
*G01J 3/12* (2006.01)

(56) References Cited

U.S. PATENT DOCUMENTS

| | | |
|---|---|---|
| 2010/0253941 A1 | 10/2010 | Brady et al. |
| 2010/0309467 A1 | 12/2010 | Fox et al. |
| 2011/0109911 A1* | 5/2011 | Podoleanu ............ A61B 3/102 356/451 |
| 2013/0293702 A1 | 11/2013 | Xin et al. |

FOREIGN PATENT DOCUMENTS

| | | |
|---|---|---|
| WO | 2007/047732 A2 | 4/2007 |
| WO | 2007/072428 A2 | 6/2007 |
| WO | 2007/121417 A2 | 10/2007 |
| WO | 2009/109078 A1 | 9/2009 |

OTHER PUBLICATIONS

Golub, et al., Spectral multiplexing method for digital snapshot spectral imaging, Applied Optics, Mar. 2009, pp. 1520-1526, vol. 48, No. 8.

Li, et al., A Compressive Sensing and Unmixing Scheme for Hyperspectral Data Processing, IEEE Transactions on Image Processing, Mar. 2012, pp. 1200-1210, vol. 21, No. 3.

Monno, et al., Multispectral demosaicking using guided filter, Proceedings of IS&T/SPIE Electronic Imagining (EI2012), Digital Photography VIII, Jan. 2012, pp. 829900-1-829900-7, vol. 8299.

Murakami, et al., Hybrid-resolution multispectral imaging using color filter array, Optics Express, Mar. 2012, pp. 7173-7183, vol. 20, No. 7.

Ng, et al., Light Field Photography with a Hand-held Plenoptic Camera, Computer Science Technical Report CSTR 2, 2005, pp. 1-11, No. 11.

Pal, et al., A Review on Image Segmentation Techniques, Pattern Recognition, 1993, pp. 1277-1294, vol. 26, No. 9.

Stern, Adrian, Compressed imaging system with linear sensors, Optics Letters, Nov. 2007, pp. 3077-3079, vol. 32, No. 21.

Wagadarikar, et al., Single disperser design for coded aperture snapshot spectral imaging, Applied Optics, Apr. 2008, pp. B44-B51, vol. 47, No. 10.

Weber, et al., Multispectral imaging of tissue absorption and scattering using spatial frequency domain imaging and a computed-tomography imaging spectrometer, Journal of Biomedical Optics, Jan. 2011, pp. 011015-1-011015-7, vol. 16(1).

\* cited by examiner

SPECTRAL IMAGING METHOD AND SYSTEM

TECHNOLOGICAL FIELD

The present invention is in the field of imaging techniques, and relates to a method and system for spectral imaging, for determining/reconstructing spectral information of an object.

REFERENCES

References considered to be relevant as background to the presently disclosed subject matter are listed below:
1. Y. Monno, M. Tanaka and M. Okutomi Proceedings of IS&T/SPIE Electronic Imaging (EI2012), Digital Photography VIII, Vol. 8299, pp. 82990O-1-7, January, 2012
2. Y. Murakami, M. Yamaguchi, and N. Ohyama, "Hybrid-resolution multispectral imaging using color filter array," Opt. Express 20, 7173-7183 (2012)
3. A. Stern, "Compressed imaging system with linear sensors," Opt. Lett. 32, 3077-3079 (2007)
4. A. Wagadarikar, R. John, R. Willett, and D. Brady, "Single disperser design for coded aperture snapshot spectral imaging," Appl. Opt. 47, B44-B51 (2008)
5. C. Li, T. Sun, K. F. Kelly and Y. Zhang. A compressive sensing and unmixing scheme for hyperspectral data processing. IEEE_J_IP 21(3), pp. 1200-1210. 2012
6. M. A. Golub, M. Nathan, A. Averbuch, E. Lavi, V. A. Zheludev, and A. Schclar, "Spectral multiplexing method for digital snapshot spectral imaging," Appl. Opt. 48, 1520-1526 (2009)
7. R. Ng, M. Levoy, M. Brédif, G. Duval, M. Horowitz, and P. Hanrahan. "Light field photography with a hand-held plenoptic camera." Computer Science Technical Report CSTR 2, no. 11 (2005).
8. J. R Weber, D. J. Cuccia, W. R. Johnson, G. H. Bearman, A. J. Durkin, M. Hsu, et al., "Multispectral imaging of tissue absorption and scattering using spatial frequency domain imaging and a computed-tomography imaging spectrometer", Journal of biomedical optics, 16(1), 011015-0110011015 (2011)
9. N. R. Pal, & S. K. Pal, "A review on image segmentation techniques", Pattern recognition, 26(9), 1277-1294, (1993).
10. D. H. Foster, S. M. C. Nascimento and K. Amano "Information limits on neural identification of colored surfaces in natural scenes," Vis. Neurosci. 21(3), 331-336 (2004).

Acknowledgement of the above references herein is not to be inferred as meaning that these are in any way relevant to the patentability of the presently disclosed subject matter.

BACKGROUND

Spectral imaging is aimed at providing at least some spectral information about an object at every location in an image plane. Various spectral imaging techniques have been developed, including multispectral imaging, hyperspectral imaging, full spectral imaging, imaging spectroscopy or chemical imaging. Spectral images are often represented as an image cube, a type of data cube.

Multispectral (MS) and hyperspectral (HS) cubes could be acquired in many ways. Some systems (utilizing whisk-broom, pushbroom and tunable filters for realizing HS imagers), rely on multiple acquisitions of 1D or 2D subsets of the 3D HS cube followed by simple reconstruction. Some other systems include polychromatic sensors that trade-off resolution with spectral information (similar to the Bayer CFA) and require spatio-spectral reconstruction algorithms [1], [2].

Recently, several HS snapshot acquisition techniques have been developed. Some of them are based on compressed sensing in which the HS image is assumed to be sparse, and an additional optical element is used within the imaging system, to compress the data [3]-[6]. However, these techniques require prior knowledge of the scene being imaged, and also typically suffer from low light efficiency, and systems implementing such techniques are rather complex.

As for the integral field spectroscopic systems, the common underlying principle of these systems is similar to light field cameras [7] in the sense that the spectral information is traded-off with spatial resolution. Thus, a number of spectral bands in the detected light is equal to the resolution degradation ratio. Integral field hyperspectral imaging techniques, such as lenslet array, fibre array, image slicer and microslicer, all exhibit this behavior. Yet another known solution concerns the use of a 2D grating that diverges incident light according to the grating' diffraction order to form multiple, multispectral sub-images on the sensor; this is followed by reconstruction algorithms [8]. This method allows fast hyperspectral cube acquisition, but the resultant image suffers from low spatial resolution; also the required setup could not be integrated in common cameras.

GENERAL DESCRIPTION

There is a need in the art in a novel technique for spectral imaging, which provides a technologically simple solution for reconstructing the spectrum of a scene or an object being imaged, enabling distinguishing between different objects or features according to their spectra.

The present invention meets the above need by providing a novel approach for determining the spectrum of an object. This approach is based on coding an input light field while creating an optical image thereof. More specifically, the input light, while propagating towards an imaging plane defined by a pixel array of a detector unit, passes through an optical coding unit. The optical unit is characterized by certain transmittance function (possibly variable in a predetermined manner), and accordingly the detected light intensity is a function of spectral data of an image and the transmittance function of the optical unit. This enables determination of the spectral data of the object being imaged. It should be understood that the detector (pixel array) is sensitive to a spectral range of the object being imaged, and the object can be imaged on at least a region of the pixel array to allow reconstruction of the corresponding spectral region of the object.

The optical unit typically includes an optical coder and an imaging lens module. The lens module may include one or more lenses, and is typically accommodated such that the pixel array (detection plane) is located in the back focal plane of the lens module.

The transmittance function of such optical unit is termed here as "effective transmittance function", because in some embodiments the transmittance function can be controllably varied. Thus, the spectral imaging system of the invention can operate in a so-called "static" mode, i.e. the effective transmittance function is fixed, enabling reconstruction of the object's spectra by acquiring a single snapshot (frame); or "dynamic" mode, according to which multiple frames (generally, at least two frames) are sequentially acquired with different effective transmittance functions. Moreover, in some embodiments of the "dynamic" mode system configuration, the transmittance function of the optical unit for each of the at least two frames is in the form of a time varying function.

Thus, the imaging system of the present invention includes an optical unit accommodated in front of the pixel array of a detector (which may be a monochromatic detector or a standard color (RGB) detector, e.g. detector with color filter arrays such as Bayer filters); and a data processor for receiving and processing the detector output data (image data). The imaging system of the invention, or at least the optical unit thereof, can be integral with a detector unit. For example, as the detector unit of an imager (camera) typically includes an imaging lens, such imaging lens may form the lens module of the imaging system of the invention.

The system configuration may generally be of two different embodiments with respect to the relative accommodation of the optical elements. In one embodiment, the coder unit is located between the lens module and the pixel array (the latter is located in the back focal plane of the lens module), and in the other embodiment the coder unit is located in front of the imaging lens module. In the latter case, the coder unit may be configured to operate in transmission or reflection mode.

In some embodiments of the invention, the optical unit is configured for applying angular coding on an input light field while creating an optical image thereof, thus providing angular multiplexing of hyperspectral image data (hyperspectral cube). More specifically, with the use of the optical unit including the angular coder and lens module in front of the pixel array, the detected light intensity at the pixel is the spectral data of the image multiplexed with the effective transmittance function of the optical unit, which is a function of angle and wavelength. The angular coder may include a dispersive unit.

The use of dispersive unit in the optical path of the input light field provides for angular multiplexing of image data. More specifically, the detected light intensity at the pixel is the spectral data of the image multiplexed with the effective transmittance function of the optical unit, which is a function of angle and wavelength. As indicated above, the effective transmittance function can be varied. This can be implemented by carrying out one or more of the following: affecting the dispersive pattern of the dispersive unit itself (i.e. tunable element), varying the focal length of the lens module, and affecting an angular position of the entire dispersive unit (non-tunable) with respect to the optical axis.

In the "static" mode configuration, i.e. the effective transmittance function is fixed, and the object's spectra (or at least part thereof) can be reconstructed by acquiring a single snapshot (frame). The only requirement is that the object is imaged on at least N pixels of the pixel array to allow reconstruction of N spectral bands. In the "dynamic" mode configuration, two or more frames are sequentially acquired with different effective transmittance functions of the optical unit, implemented as described above. In this case, the image data pieces for different frames can be processed for reconstructing different spectral segments of the object's spectra.

The principles of the embodiments of the present invention utilizing angular coding (angular multiplexing of image data) can be explained by the following example. Typically in any imaging system, each pixel measures the overall intensity of incident light rays at different angles (the light ray bundle between the two marginal rays). In the imaging system of the invention utilizing the dispersive unit, each ray is incident on the dispersive unit at a slightly different angle, and accordingly its transmission spectrum is slightly modified. Hence, invention each pixel measures the integrated intensity of multiple weighted modified spectra. As the spectral transmittance of the dispersive unit and the angular properties of the lens module are known, the only variable is the spectra of the object. Assuming that adjacent pixels share the same spectra, a reconstruction algorithm could be applied to recover the spectra of the object.

In some other embodiments of the invention, the optical coder includes a tunable filter, and a detector unit includes a rolling shutter type detector array. The detector array may be color pixel array, e.g. utilizing a color filter for different detector elements (such as Bayer filter) or a monochromatic filter. The tunable filter is configured and operable for varying its effective transmittance between at least two different transmission profiles, with a predetermined time pattern of the transmission profile variation. Preferably, a tunable color filter is used, namely different effective transmittance functions are different functions of wavelength (i.e. spectral transmission profiles).

Rolling shutter type detector arrays are generally configured so as to selectively expose a part of the pixel array (line) to input light. More specifically, the detector unit has a shutter with an opening configured to cover all the columns of the pixel array but allowing only a predetermined number of rows to be exposed to input light at a time. After the predetermined exposure time, the detector provides readout of the collected data from the detector elements (pixels) of the line and adds it to the generated image data. The time pattern of the variation of the transmission profile of the tunable filter has a time scale corresponding to exposure time of a predetermined number of rows, e.g. 2 rows, 25 rows, etc. It should be noted that in digital type detector arrays, the exposure time may be defined by time of data collection/integration of each detector element of the array. More specifically, a capacitor associated with the detector element may be discharged, and allowed to be recharged due to light collection of the associated detector unit for an integration time period. After the integration/exposure time, the voltage/charge in the capacitor is measured to determine collected light intensity. To this end the term exposure time as used herein should be interrupted broadly as relating to time of light collection by a detector element.

This configuration provides generation of image data by different rows indicative of light coded by two or more different transmission profiles of the tunable filter. Based on the predetermined (known) wavelength sensitivity of the detector elements and the predetermined (known) two or more transmission profiles of the tunable filter, as well as the predetermined time pattern thereof, the system can generate data indicative of the spectrum of an object being imaged, i.e. spectral information of an image in the field of view of the system. Generally, to provide such data, an image of the object should include at least a predetermined number of rows in the image data.

Thus, according to one broad aspect of the invention, there is provided an imaging system for use in reconstructing spectral data of an object being imaged, the imaging system comprising: an optical unit; a detector having a pixel array sensitive to a predetermined spectrum; and a data processor for receiving and processing image data indicative of light detected by the pixel array and generating reconstructed spectral data of the object being imaged; wherein the optical unit is configured and operable for applying predetermined coding to an input light field while creating an optical image thereof on an imaging plane defined by the pixel array, the image data being therefore a function of said predetermined coding and a spectrum of the object to be determined.

The optical unit comprises a coder assembly configured for applying said predetermined coding, and an imaging lens module. The imaging plane is located in the back focal plane of the lens module. The coder assembly may be accommodated in the optical path of the input light between the lens module and the detection plane; or may be accommodated upstream of the lens module and operable in either transmission or reflection mode. The detector may be monochromatic or color detector, as described above. The coding applied to the input light field is defined by effective transmittance of the optical unit. The effective transmittance is a function of wavelength and in some embodiments is a function of angle of light propagation and in some other embodiments is a function of time.

The imaging system may further include a controller for modifying the effective transmittance of the optical unit, thereby enabling acquisition of sequential frames with different effective transmittances of the optical unit.

As described above, in some embodiments, the coder assembly is configured for applying angular coding to the input light by using a dispersive unit. In such embodiments, the controller may be associated with at least one of the dispersive unit and the lens module for carrying out at least one of the following: affecting the dispersive pattern of the tunable dispersive unit, affecting an angular position of the dispersive pattern with respect to an optical axis of the optical unit, varying a focal length of the lens module, and displacing the lens module.

As also described above, in some embodiments, the optical unit is configured for applying time varying spectral coding to the input light, and the detector is a rolling shutter type detector. In such embodiments, the controller is associated with the color filter and the same controller or another one is associated with the shutter of the detector.

According to another broad aspect of the invention, there is provided an imaging system for use in reconstructing spectral data of an object being imaged, the imaging system comprising: an optical unit; a pixel array of a detector; and a data processor for receiving and processing image data indicative of light detected by the pixel array and generating reconstructed spectral data of the object being imaged; wherein the optical unit is configured and operable for applying a predetermined angular code to an input light field while creating an optical image thereof on a detection plane defined by the pixel array, the image data being therefore a function of said predetermined angular code and a spectrum of the object to be determined.

The optical unit is configured for imaging the object on at least N pixels of the pixel array, thereby allowing reconstruction of N spectral bands of the object being imaged.

The optical unit includes a dispersive unit and a lens module including one or more lenses. A given relative orientation of the lens module (which defines the optical axis of the optical unit) and a dispersive pattern of the dispersive unit define an effective spectral transmittance of the optical unit, and accordingly define the corresponding function of the angular coding. The dispersive unit may be tunable enabling controllable variation of the dispersive pattern thereof as described above; or may include a dispersive element having the predetermined fixed dispersive pattern.

In some embodiments, the processing unit is configured and operable for pre-processing the image data corresponding to acquired frame of a region of interest for identifying the object whose spectral data is to be reconstructed, and utilizing the effective spectral transmittance corresponding to said frame acquisition for processing the image data of the identified object and reconstructing the object's spectrum. The pre-processing may include one or more pattern recognition algorithms, including for example segmentation algorithm(s), aimed at identifying the object having a substantially uniform spectral content.

According to another broad aspect of the invention, there is provided an imaging method for use in reconstructing spectral data of an object, the method comprising: applying angular coding on an input light field from a region of interest while creating an optical image of the light field on at least N pixels of the pixel array, and processing image data corresponding to light detected by the pixel array during at least one frame acquisition and reconstructing at least N spectral bands of the object being imaged.

The application of angular coding while imaging comprises interacting the input light field with a dispersive pattern.

According to yet another broad aspect of the invention, there is provided an imaging system for use in reconstructing spectral data of an object being imaged, the imaging system comprising: an optical unit; a rolling shutter type detector comprising a pixel array; and a data processor for receiving and processing image data indicative of light detected by the pixel array and generating reconstructed spectral data of the object being imaged; wherein the optical unit comprises a tunable filter which is located in an optical path of an input light field propagating towards said pixel array and is configured and operable to vary transmittance thereof between at least two different transmission profiles with a predetermined time pattern such that light sequentially detected by at least two rows of the pixel array correspond to at least two different transmission profiles of the tunable filter.

The data processor may utilize data about operation of said rolling shutter type detector and data about said predetermined time pattern of the tunable filter to determine said spectral data. The object within the image can be identified by image segmentation or any other type of image filtering. A reconstruction algorithm may utilize the intensity of detected light and the per-row spectral differences to recover the spectral data of the object.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4A shows a cropped RGB image with marked regions of interest, and FIG. 4B shows original and reconstructed spectra for each of the regions of interest;

DETAILED DESCRIPTION OF EMBODIMENTS

Figure 1:
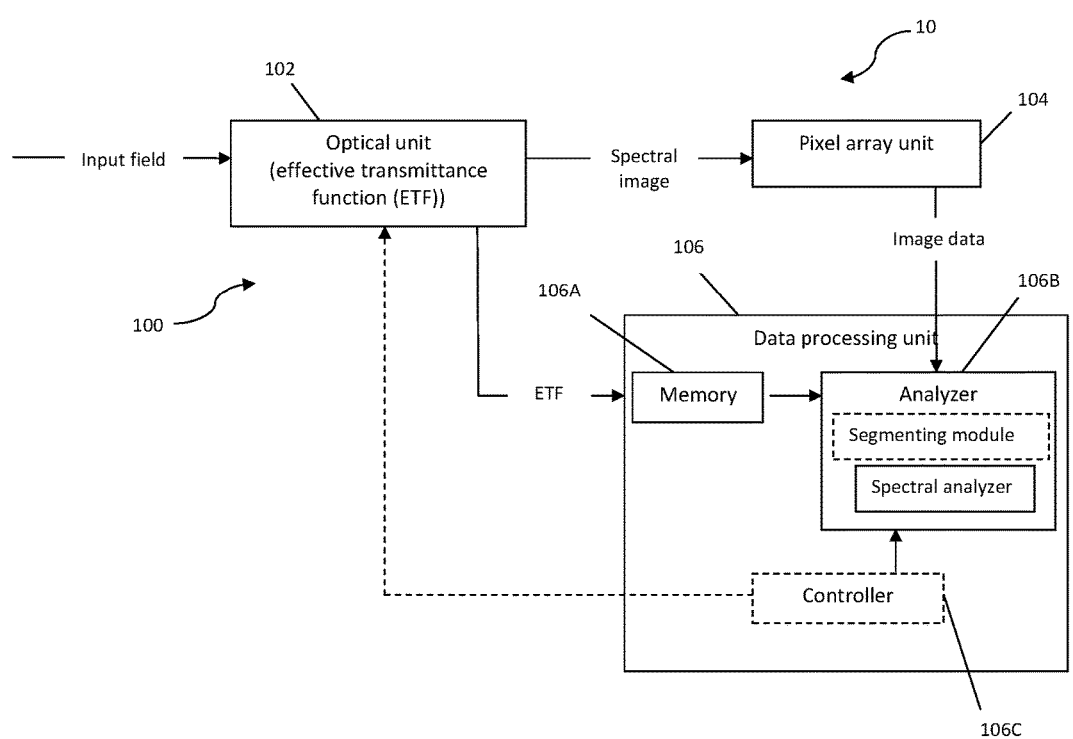
FIG. 1 is a schematic illustration of a sensing system utilizing an imaging system of the invention.

Referring to FIG. 1, there is schematically illustrated, by way of a block diagram, a sensing system (detection system) 10 utilizing an imaging system 100 of the invention. The imaging system 100 includes an optical unit 102 for locating in front of a light sensitive surface (detection/image plane) defined by a pixel array unit 104 of the sensing system, and a data processor unit 106 configured for data communication with a readout circuit of the pixel array unit 104 for receiving image data therefrom. The data processing unit 106 may be integral with the pixel array unit 104, e.g. may be a software module of the readout circuit of the pixel array unit 104.

The optical unit 102 is configured and operable for applying predetermined coding to an input light field while creating an optical image thereof on an imaging plane defined by the pixel array unit 104. The image data, corresponding to the detected light signal, is a function of the predetermined coding and a spectrum of the object (i.e. of the input light field). The predetermined coding is defined by an effective transmittance function (ETF) of the optical unit used in the respective image acquisition session (frame).

The optical unit 102 includes a coder assembly configured for applying predetermined coding, and an imaging lens module. The imaging plane is located in the back focal plane of the lens module. The coder assembly may be accommodated in the optical path of the input light between the lens module and the detection plane; or may be accommodated upstream of the lens module and operable in either transmission or reflection mode. The detector may be monochromatic or color detector, as described above. The coding applied to the input light field is defined by ETF of the optical unit. The ETF is a function of wavelength, and in some embodiments is also a function of angle of light propagation and in some other embodiments a function of exposure time.

The processor unit 106 includes inter alia data input/output utilities (not shown), a memory module 106A (e.g. for storing the ETF of the optical unit being used), and an analyzer module 106B adapted for analyzing the image data from the pixel array unit 104 using the ETF data of the optical unit for the corresponding image frame, and determining the spectra of the object. This will be described more specifically further below.

In some embodiments of the invention, the processor unit 106 also includes a controller 106C associated with the optical unit 102 for managing the controllable variation of the ETF of the optical unit 102. As indicated above, and will be described more specifically further below, the ETF of the optical unit 102 may be variable. In some embodiments, the controller 106C is also associated with a shutter of the pixel array unit for controlling (or receiving data indicative of) the exposure time pattern.

As described above, in some embodiments of the invention, the optical unit 102 is configured and operable for applying angular coding to the input light field while creating an optical image thereof on a detection plane, i.e. light sensitive surface of pixel array unit 104. The angular coding applied by the optical unit 102 is defined by the (ETF) of the optical unit, which is a function of both light propagation angle and wavelength.

Typically, in an imaging system, each pixel measures the overall intensity of light rays incident on said pixel at different angles (the light ray bundle between the two marginal rays). The optical unit 102 including an angular coding imaging assembly provides that each light ray of the input light $L_{in}$ impinges on the optical unit at a slightly different angle and corresponding output light $L_{out}$ has a slightly modified transmission spectra. Thus, each pixel in the pixel array unit 104 measures the integrated intensity of multiple weighted modified spectra. As the ETF of the optical unit 102, for the given image frame being acquired, is fixed and known, the only variable affecting the detected intensity is the spectra of the object. Assuming that adjacent pixels share the same spectra, a reconstruction algorithm could be applied to recover the spectra of the object.

More specifically, in such embodiments, the optical unit 102 includes a dispersive unit/element (constituting an angular coding unit) and an imaging lens module (constituting an imaging unit). The ETF of such optical unit 102 is thus defined by spectral transmittance of the dispersive unit and angular properties of the lens module. As will be described more specifically further below, the ETF of the angular coding based optical unit 102 may be varied by applying at least one of the following: changing the dispersive pattern of the tunable dispersive element, varying the focal length of the lens module, and affecting an angular position of the entire dispersive element with respect to the optical axis.

Figure 2A:
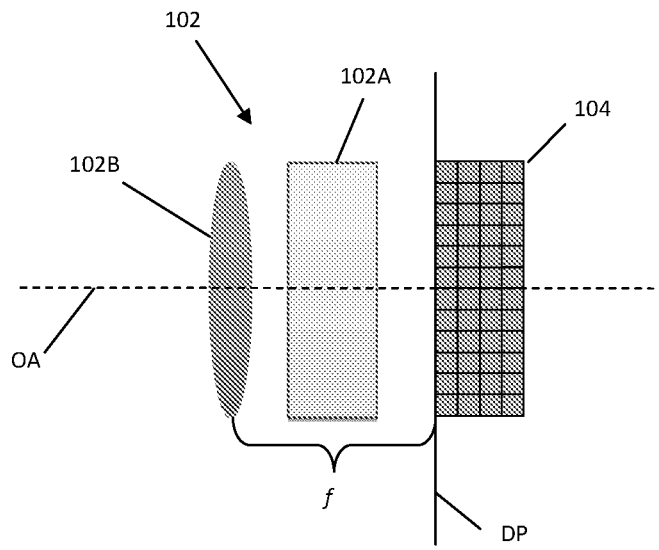
FIGS. 2A and 2B more specifically illustrate two non-limiting examples, respectively of the imaging system of the invention.
Figure 2B:
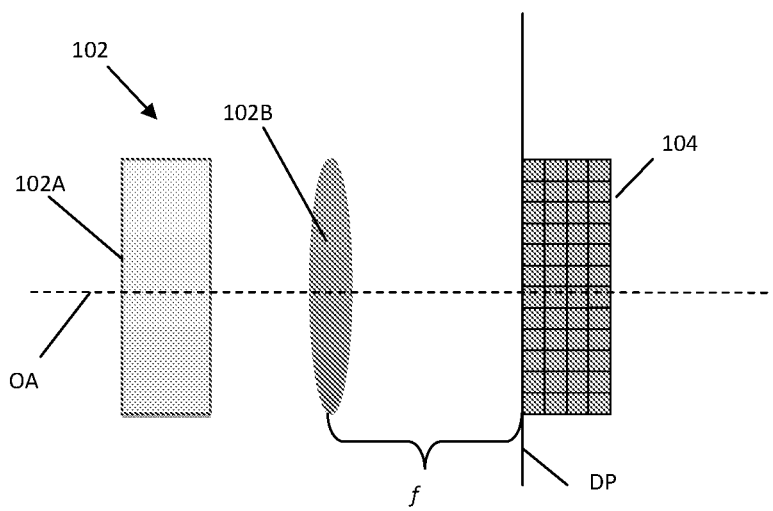

Reference is made to FIGS. 2A and 2B showing schematically two specific but not limiting examples of the configuration of the optical unit 102. To facilitate understanding, the same reference numbers are used for identifying components that are common in all the examples. As shown, the optical unit 102 includes a coder unit (e.g. dispersive unit/element) 102A and a lens module 102B (single imaging lens in the present example). The detection plane DP defined by the pixel array unit 104 is located in the back focal plane of the lens module 102B.

In the example of FIG. 2A, the coder unit 102A is located between the lens 102B and the detection plane DP, and in the example of FIG. 2B, the coder unit 102A is located in front of the lens module 102B.

Considering the angular coding based optical unit, it may include a dispersive unit may including a dispersive element of any known suitable configuration being either active (tunable dispersive pattern) or passive (fixed dispersive pattern). For example, an etalon can be used as a dispersive element. In the simulations performed by the inventors, an air spaced Fabry-Perot etalon was used as the dispersive element, where transmitted spectra varies with the incidence angle.

Figure 2C:
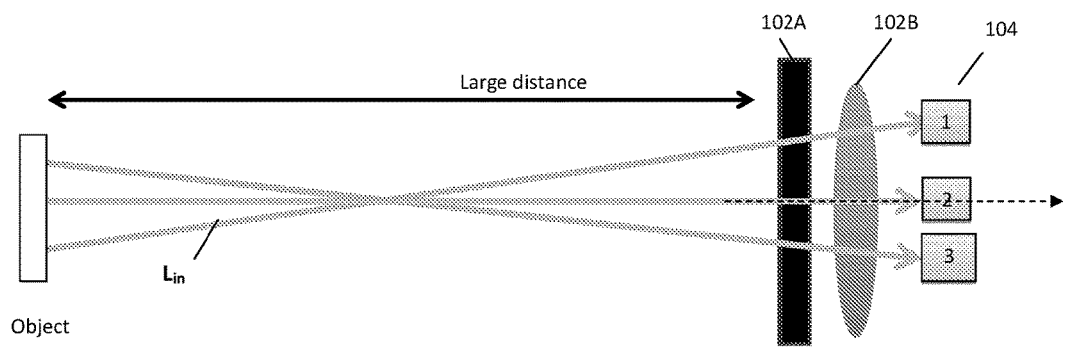
FIGS. 2C and 2D show schematically the light propagation scheme in the imaging system configurations of FIGS. 2A and 2B according to some embodiments of the invention.
Figure 2D:
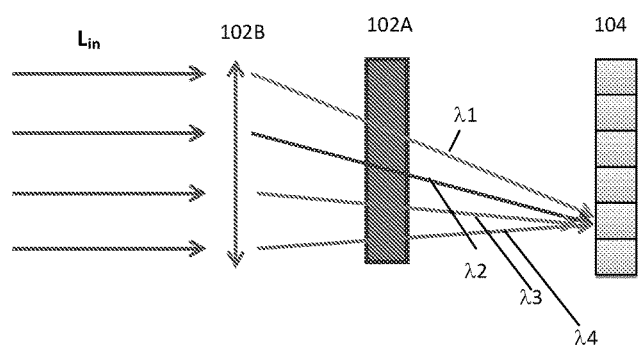

Reference is made to FIGS. 2C and 2D exemplifying schematically the light propagation through the imaging system of the configurations of FIGS. 2A and 2B, respectively, during the frame acquisition, for the angular coding based optical unit. As shown in FIG. 2C, each ray of input light field $L_{in}$ impinges the dispersive element 102A at a different angle, which modifies its transmitted spectrum. The transmission spectra variations across different angles present a known characteristic of the dispersive element. Each pixel thus measures a weighted sum of the rays, each of them with a different spectrum. The coefficients of the weighted sum are known and are a property of the optical design. By applying an image processing algorithm for image segmentation followed by spectral decomposition algorithm, a hyperspectral cube can be reconstructed.

More specifically, per pixel, the overall acquired intensity could be described by:

$$I = \int_\theta \sum_\lambda w_\theta T_\theta(\lambda) R_\lambda \tag{1}$$

where I denotes the total acquired signal, $w_\theta$ denotes the weight of rays with angle $\theta$, $T_\theta(\lambda)$ denotes the spectral transmittance of etalon at angle $\theta$, and $R_\lambda$ denotes the objects' reflectance spectra. Close to the optical axis, the light spot is approximately circular, so the angular weight function takes the form:

$$w_\theta = \frac{8}{(\theta_h - \theta_l)^2} \cdot \begin{cases} 0 & \theta < \theta_l, \theta > \theta_h \\ \frac{1}{2\pi} & \theta = \theta_{CRA} \\ |\theta - \theta_{CRA}| & \text{otherwise} \end{cases} \tag{2}$$

where $\theta_l$ and $\theta_h$ denote the lower and upper marginal rays, respectively and CRA denotes chief ray angle.

Then, the generalized multiplexed spectral transmittance is given by:

$$T^{CRA}(\lambda) = \int_\theta w_\theta T_\theta(\lambda) \tag{3}$$

Plugging eq. (3) in eq. (1) yields:

$$I = \sum_\lambda T^{CRA}(\lambda) R_\lambda \tag{4}$$

Alternatively, the dispersive element could be placed in front of the lens as shown in FIGS. 2B and 2D. In cases where the imaged object is far enough, this configuration is simplified as the weight function could be assumed to be uniform:

$$w_\theta \cong 1 \quad \forall \theta \subset \text{field of view} \tag{5}$$

As shown in the simple case of FIG. 2D, a single object emits a spectrum of three wavelengths only imaged to three pixels. The dispersive element has a transmittance function that depends on both wavelength and angle. Per point in the scene, the angle is quite uniform across the lens (effectively equal to the CRA). Hence, per pixel, all rays are assumed to be in a single angle. Then, the measured intensities (pixel values) matrix is given by:

$$\begin{pmatrix} I_{pix1} \\ I_{pix2} \\ I_{pix3} \end{pmatrix} = \begin{pmatrix} T_{11} & T_{12} & T_{13} \\ T_{21} & T_{22} & T_{23} \\ T_{31} & T_{32} & T_{33} \end{pmatrix} \begin{pmatrix} R(\lambda_1) \\ R(\lambda_2) \\ R(\lambda_3) \end{pmatrix} \tag{6}$$

where R is the spectra of the object (three wavelength only $\lambda_1$, $\lambda_2$ and $\lambda_3$); T is the transmittance matrix that depends on both wavelength and angle (for example, a standard etalon); $T_{i,j}$ describes the transmittance of the i-th angle of j-th wavelength; I is the measurement vector.

Thus, R is the only unknown and could be reconstructed by:

$$R = T^{-1} \cdot I \tag{7}$$

Practical consideration requires much higher number of pixels (i.e. measurement angles). As will be described further below, in order to further increase the spectral resolution of measurements, a sequence of multiple frames can be images using different ETFs of the optical unit for different frames. Variation of the ETF may be performed by displacing or tilting the dispersive element; and/or displacing the lens (by the focus mechanism) parallel to the optical axis; and/or displacing the lens (by the OIS mechanism) perpendicular to the optical axis.

Figure 3:
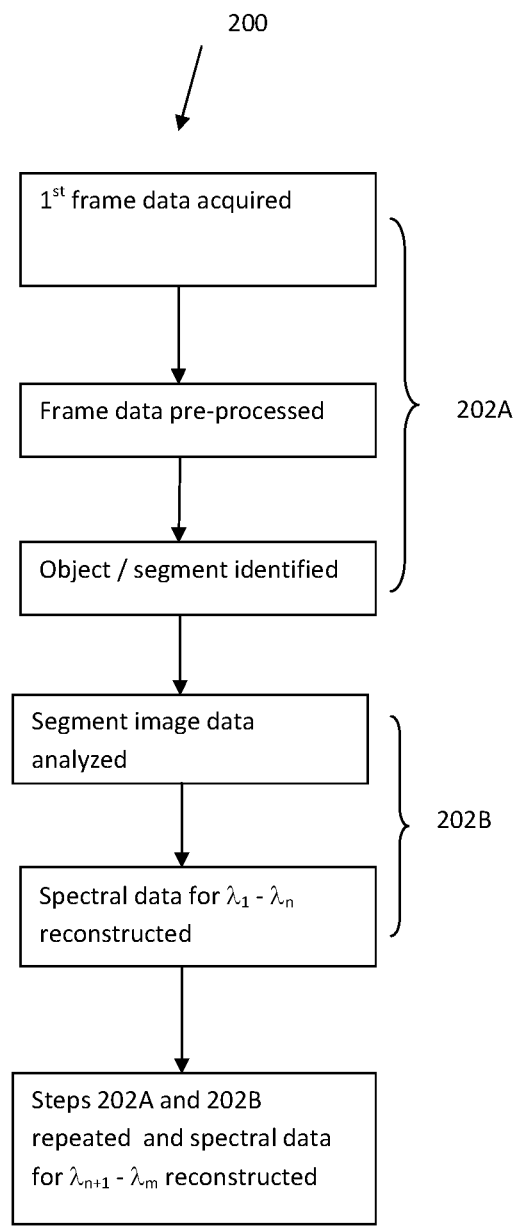
FIG. 3 illustrates a flow diagram of an example of the method of the invention for operating the imaging system and processing the image data for reconstructing the spectral data of an object/scene being imaged.

The following is an example of the spectral reconstruction process used in the embodiments of the invention utilizing angular coding of input light field being image. In this connection, reference is made to FIGS. 1 and 3 showing the construction of the processing unit 106 and a flow diagram 200 of its operation. The processing unit 106 operates to apply spectral reconstruction procedure to the image data per frame. Such procedure includes two phases: pre-processing phase 202A and reconstruction phase 202B.

The pre-processing phase 202A is carried out by a segmenting module of the analyzer 106B and is applied to the image data resulting from the frame acquisition. The pre-processing includes applying an image segmentation algorithm to the frame data aimed at distinguishing objects within the scene. Possible realization of such algorithms could be based on any known pattern recognition technique, as described for example in [9], incorporated herein by reference. The object (or segment) that is to be identified is that of a "uniform spectral content". The latter means that, for a single, segmented, object the detected pixels' intensities differ only by a gain factor (due to spatial lighting variations) and not by spectral content. Thus, such object/segment is identified and image data from the respective pixels is processed by spectral analyzer module of the analyzer 106B to reconstruct the spectral content of the object (step 202B). The spectral analyzer module operates to apply to the image data decomposition algorithms to reconstruct a hyperspectral cube, Assuming that the setup described in FIG. 2B is utilized, each pixel is related to a specific CRA which depends on the distance from the optical axis (due to axial symmetry). Thus, several pixels may have equal radii and thus, equal CRAs, which is advantageous for noise handling. In this case, eq. (4) could be re-written by:

$$\begin{pmatrix} T^1(\lambda_1) & T^1(\lambda_2) & \dots & T^1(\lambda_N) \\ T^2(\lambda_1) & T^2(\lambda_2) & \dots & T^2(\lambda_1) \\ \vdots & \vdots & \ddots & \vdots \\ T^M(\lambda_1) & T^M(\lambda_2) & \dots & T^M(\lambda_N) \end{pmatrix} \cdot \begin{pmatrix} R(\lambda_1) \\ R(\lambda_2) \\ \vdots \\ R(\lambda_N) \end{pmatrix} = \begin{pmatrix} I_1 \\ I_2 \\ \vdots \\ I_M \end{pmatrix} \tag{8}$$

where M is the number of pixels (and CRAs) associated with the object, and N is the number of spectral bands. In case M<N, a linear least mean squares is applied.

As further shown in FIG. 3, in case the penalty in resolution is not acceptable, additional frames can be acquired with different effective spectral transmittance of the optical unit. The effective spectral transmittance can be varied by displacing the lens (by the focus mechanism) parallel to the optical axis, displacing the lens (e.g. by an optical image stabilizer (OIS) mechanism) perpendicular to the optical axis, or displacing or tilting the dispersive element. Processing of the image data for different frames allows reconstruction of different spectral segments of the object's spectrum.

Figure 4A:
FIGS. 4A and 4B show simulation results obtained by the inventors, where
Figure 4B:
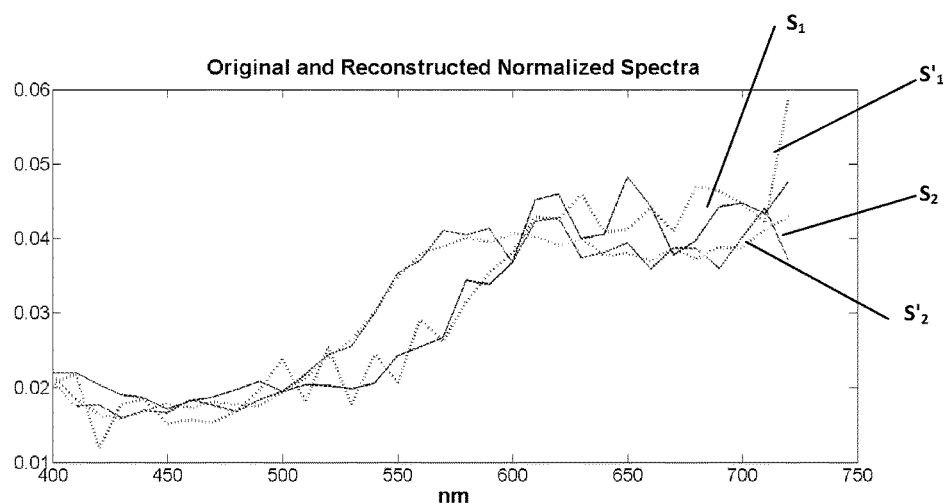

Reference is made to FIGS. 4A and 4B showing the simulation results obtained by the inventors. FIG. 4A shows a cropped RGB image taken from the hyperspectral cube (obtained from [10]), where rectangle-marks $M_1$ and $M_2$ correspond to the two regions of interest. FIG. 4B shows spectra $S_1$ and $S'_1$ corresponding to the original and reconstructed spectra of region $M_1$, and $S_2$ and $S'_2$ corresponding to the original and reconstructed spectra of region $M_2$.

Figure 5:
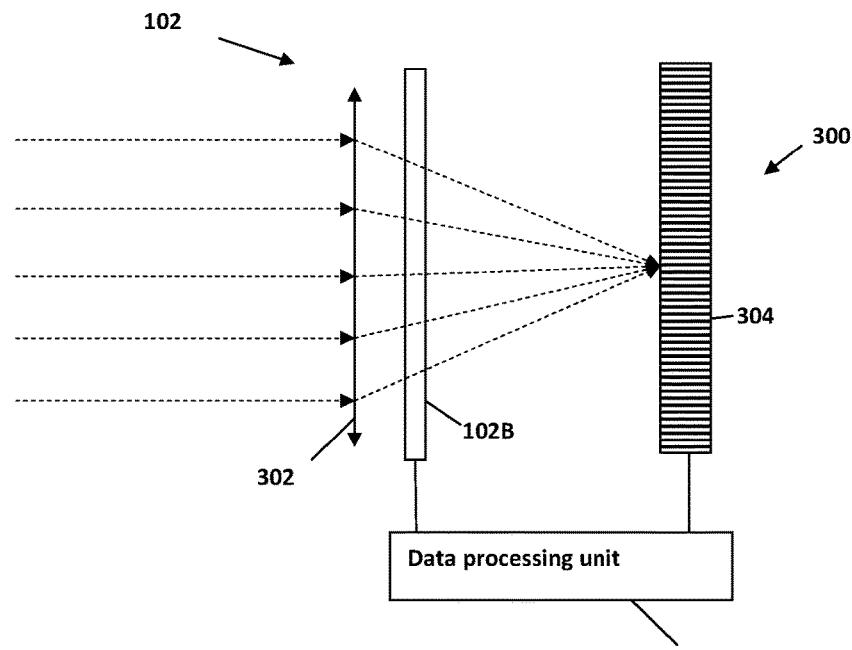
FIG. 5 shows schematically the light propagation scheme in the imaging system configuration according to some other embodiments of the invention.

As indicated above, in some other embodiments of the invention, a tunable filter and rolling shutter type detector array are utilized, providing to obtain spectral information of an object by using at least two image frames obtained with timely varying ETF. In this connection, reference is made to FIG. 5 which illustrates a system 300 including a rolling shutter type detector array 304; an optical unit 102 including an imaging arrangement (e.g. lens arrangement) 102B configured for directing light coming from a scene to generate an image on the detector array, and a tunable filter 302 (constituting a coder unit) located in optical path of light input towards the detector. As described above, the filter 302 may be upstream or downstream of the imaging arrangement 102B with respect to input light propagation direction. The filter 302 may also be located between the elements of the imaging arrangement 102B as the case may be.

The tunable filter 302 is configured to vary the ETF thereof, between two or more different transmission profiles, with a predetermined time pattern. More specifically, the tunable filter 302 may be a color filter having two or more different color transmission profiles, and switching between said transmissions profiles is performed with a predetermined time intervals. For example, the tunable filter may very its transmission between predetermined bandwidth around 700 nm to predetermined bandwidth around 500 nm, i.e. between red and green transmission. Alternatively, the filter 302 may very its transmission between red, green and blue; or between red/green/blue and white (full spectrum). It should also be noted that the transmission profile may include near IR wavelengths and/or near UV spectra. It should also be noted that the tunable filter 302 may be configured to cover a full frame region, i.e. global filtering.

Generally, the time pattern of the ETF variation of the tunable filter 302 is configured to correspond to the exposure time of one or more rows of the rolling shutter type detector array 304. Thus, the detector array 304 generates image data in which different rows correspond to different transmission profiles (different ETFs) of the tunable filter 302.

The system also includes a data processing unit 106 configured as described above, to receive image data from the detector 304 and determine spectral information of one or more objects in a field of view being imaged. Generally, the image data may be such that objects of interest occupy at least a predetermined number of rows of pixels. Thus, the detector 304 collects input light from different regions of the object through two or more different wavelength filtering. Based on predetermined data about spectral response of the detector elements of the detector array, and data about the time pattern and the two or more transmission profiles of the tunable filter 302, the data processing unit 106 may determine the spectral information of the object of interest.

It should be noted that some rows in the image data may result from the exposure to two or more filtering profiles, as the tunable filter may vary its transmission while these rows are exposed to input light. Based on the time pattern of the EFT variation, the image data of the rows of pixels can be expressed by weighting the effect of each EFT based on the relative time of exposure corresponding to each EFT.

It is generally known that rolling shutter image sensors acquire an image row by row with a predetermined exposure time and a typically short readout time per row (~15-40 µs). Acquiring a series of frames (for example, video or burst mode) is executed such that the first row of each successive frame is read right after the last row of the preceding frame. Thus, the exposure scheme of a frame (or multiple frames) is a parallelogram within the row-time plane.

Figure 6:
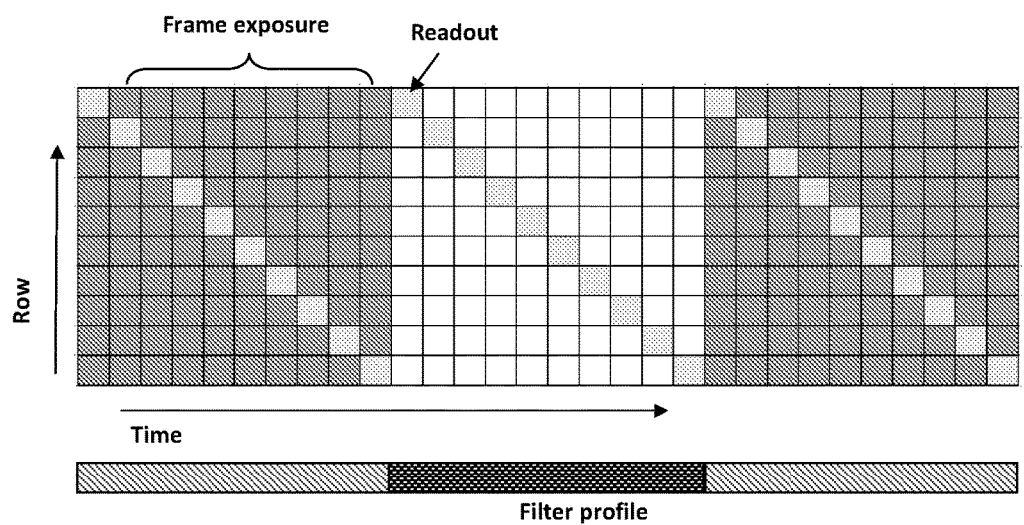
FIGS. 6 and 7 exemplify the operational scheme of the present invention in the embodiments of FIG. 5.

FIG. 6 illustrates the concept of rolling shutter type detector and readout thereof. In this non limiting example, the exposure time is 9 time units, while the readout time takes 1 time unit; this is marked for the top row. Thus, in a single time unit, after the beginning of exposure for the first row, the second row is being exposed to light, such that it is being readout 1 time unit after the readout of the previous row. As shown, the filter profile varies with time, in this example each 10 time units, resulting in that different rows are exposed to input light of different wavelength profiles. For each row, the collected data corresponds to input light of weighted filtering based on the time in which the tunable filter has a first transmission profile and time in which it has a second transmission profile (and third and fourth when applied).

Thus, each row-image is acquired with a varying mixture of two or more filter modes. For example, the first row is acquired with a single filter state ("red" state), whereas the last row acquires the light with a "white" state. All other rows acquire the image with a varying linear mixture of filter states (red and white).

If such a system is used to image a rectangular object of N rows, the image contains N different weighted mixtures of red and white filter states, which allows reconstructing the spectrum of the object. Such spectrum reconstruction may provide N spectral bands.

The object identification can be done by image segmentation (e.g. to determined that a single object is detected and not multiple objects). Various object detection algorithms may be used.

The Spectral Reconstruction utilizes data about the number N of row identified as part of the object. The system determines a cross-section of the intensity along a vertical line within the image, to obtain the following (for object occupying 4 rows in the image data):

$$I_1 = \left(\frac{1}{T_{1R}+T_{1W}}\right)(T_{1R}F_R E + T_{1W}F_W E)$$

$$I_2 = \left(\frac{1}{T_{2R}+T_{2W}}\right)(T_{2R}F_R E + T_{2W}F_W E)$$

$$I_3 = \left(\frac{1}{T_{3R}+T_{3W}}\right)(T_{3R}F_R E + T_{3W}F_W E)$$

$$I_4 = \left(\frac{1}{T_{4R}+T_{4W}}\right)(T_{4R}F_R E + T_{4W}F_W E)$$

where:
$T_{ij}$ is the exposure time for filter state j (Red/White) for i-th row;
$F_R/F_W$ is the spectral transmission profiles of the filter states (resolution of 4 spectral bands, in general of N spectral bands);
E is the spectral profile (of the object), for reconstruction (resolution of 4 spectral bands).

It should be noted that, as all the parameters other than the spectral profile E are either measured or known as parameters of the system, the data processing unit can apply the suitable algorithms to determine the spectral profile of the object E.

Figure 7:
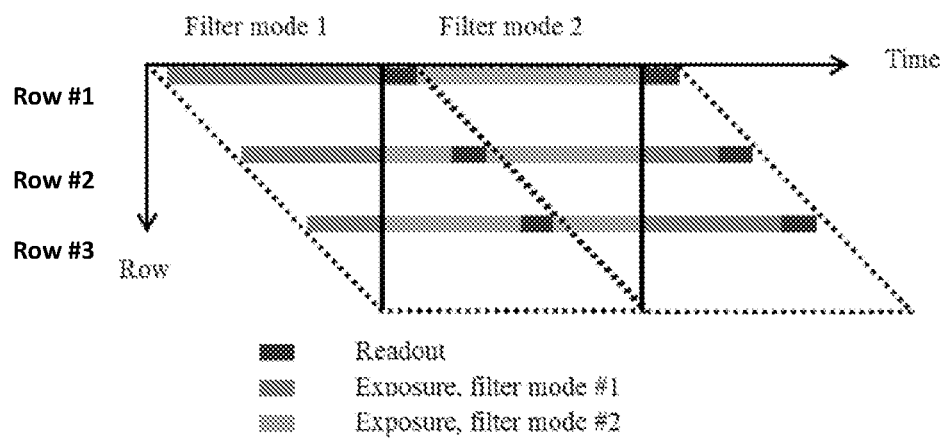

FIG. 7 exemplifies the technique of the invention utilizing 3 rows (many more rows are generally used), marked by #1 (upper), #2 (middle) and #3 (lowest). Transmission profiles of the filter are noted herein below as blue for filter mode #1, and orange for filter mode #2. The average spectral transmittance obtained by the filter can be described by:

$$T_1(\lambda) = t_1^{blue} \cdot T^{blue}(\lambda) + t_1^{orange} \cdot T^{orange}(\lambda)$$

$$T_2(\lambda) = t_2^{blue} \cdot T^{blue}(\lambda) + t_2^{orange} \cdot T^{orange}(\lambda)$$

$$T_3(\lambda) = t_3^{blue} \cdot T^{blue}(\lambda) + t_3^{orange} \cdot T^{orange}(\lambda)$$

where: $T^{blue}(\lambda)$ is the spectral transmittance of the 'blue' mode and $T^{orange}(\lambda)$ is the spectral transmittance of the 'orange' mode; $t_1^{blue}$ is the exposure time through the blue filter for row #1, and accordingly for the other rows and other filter mode.

Because of the parallelogram structure, the following applies:

$$t_1^{blue} \neq t_2^{blue} \neq t_3^{blue}, \quad t_1^{orange} \neq t_2^{orange} \neq t_3^{orange}$$

In view of the above, the inequality $T_1(\lambda) \neq T_2(\lambda) \neq T_3(\lambda)$ provides unique spectral transmittance for each row. Therefore, for objects large enough (10's of rows, for example—40) and with uniform emitted spectra the image data contains spectral information of the object as if it was measured through different spectral filters in a number corresponding to the number of relevant rows. This provides N (e.g. 40) different measurement of the object's spectrum and allows to determine its spectral profile.

As indicated above, the total acquired signal is:

$$I_1 = [t_1^{blue} \cdot T^{blue}(\lambda) + t_1^{orange} \cdot T^{orange}(\lambda)] \cdot S(\lambda)$$

$$I_2 = [t_2^{blue} \cdot T^{blue}(\lambda) + t_2^{orange} \cdot T^{orange}(\lambda)] \cdot S(\lambda)$$

$$I_3 = [t_3^{blue} \cdot T^{blue}(\lambda) + t_3^{orange} \cdot T^{orange}(\lambda)] \cdot S(\lambda)$$

where $S(\lambda)$ is the spectral profile of light emitted or reflected from the object of interest and $I_j$ is the actual measured intensity for a pixel in the j-th row. Utilizing the predetermined and measured data, the spectral profile of the object may be determined.

Thus, the present invention provides an effective technique for spectral data reconstruction. The technique of the invention provides for single snapshot reconstruction, or, if needed, multiple-frame data reconstruction for increasing the spectral resolution.

The invention claimed is:

1. An imaging system for use in reconstructing spectral data of an object being imaged, the imaging system comprising: an optical unit; a detector having a pixel array configured and operable to detect light from the optical unit and generate image data indicative of the detected light; and a data processor configured and operable to receive and process the image data indicative of the light detected by the pixel array and generating reconstructed spectral data of the object being imaged by the optical unit; wherein the optical unit is configured and operable for applying predetermined angular coding to an input light field while creating an optical image thereof on an imaging plane defined by the pixel array, such that the image data is a function of a predetermined angular code and a spectrum of the object to be determined.

2. The system of claim 1, wherein the optical unit comprises a coder assembly configured for applying said predetermined angular coding, and an imaging lens module, the imaging plane defined by the pixel array being located in the back focal plane of the lens module.

3. The system of claim 2, wherein the coder assembly is accommodated in the optical path of the input light between the lens module and the imaging plane.

4. The system of claim 2, wherein the coder assembly is accommodated upstream of the lens module with respect to input light propagation direction.

5. The system of claim 2, wherein the coder assembly is operable in transmission or reflection mode.

6. The system of claim 2, wherein the coder assembly comprises a dispersive unit, a given relative orientation of said lens module and a dispersive pattern of said dispersive unit defining given effective spectral transmission function of the optical unit, the predetermined angular code being defined by the effective spectral transmission function.

7. The system of claim 6, comprising a controller associated with at least one of the dispersive unit and the lens module and configured and operable for modifying the effective spectral transmission function of the optical unit by carrying out at least one of the following: affecting the dispersive pattern of a tunable dispersive unit, affecting an angular position of the dispersive pattern with respect to an optical axis of the optical unit, varying a focal length of the lens module, and displacing the lens module.

8. The imaging system of claim 6, wherein the dispersive unit comprises an etalon.

9. The imaging system of claim 6, wherein the dispersive unit is tunable enabling controllable variation of the dispersive pattern thereof.

10. The imaging system of claim 6, wherein the dispersive unit comprises a dispersive element having the predetermined dispersive pattern.

11. The system of claim 1, wherein the detector is a monochromatic or color detector.

12. The system of claim 1, wherein the angular coding applied to the input light field is defined by an effective spectral transmission function of the optical unit.

13. The system of claim 12, further comprising a controller configured and operable to sequentially modify the effective spectral transmission function of the optical unit, to modify the angular coding applied to the input light field, the image data being thereby indicative of sequentially acquired frames with different angular coding of the input light field.

14. The imaging system of claim 12, wherein the angular coding applied by the optical unit provides angular multiplexing of image data at the pixel array, such that the detected light intensity at the pixel corresponds to the spectral data of the image multiplexed with the effective transmittance function of the optical unit.

15. The imaging system claim 12, wherein the processing unit is configured and operable to pre-process the image data corresponding to image of a region of interest within an acquired frame and identify the object whose spectral data is to be reconstructed, and utilize the effective spectral transmission function corresponding to acquisition of said frame for processing the image data of the identified object and reconstructing the object's spectrum.

16. The imaging system of claim 15, wherein said pre-processing comprises applying at least one pattern recognition algorithm to the image data from the detector to identify the object having a substantially uniform spectral content.

17. The imaging system of claim 1, wherein the optical unit is configured for imaging the object on at least N pixels of the pixel array, thereby allowing reconstruction of N spectral bands of the object being imaged.

18. The imaging system of claim 17, wherein the optical unit includes a dispersive unit and a lens module including one or more lenses, a given relative orientation of said lens module and a dispersive pattern of said dispersive unit defining an effective spectral transmittance of the optical unit, the predetermined angular code being defined by the effective spectral transmission function.

19. A system for use in reconstructing spectral data of an object, the system comprising: an optical unit, an imaging lens module and a dispersive unit, a given relative orientation of said lens module and a dispersive pattern of said dispersive unit defining a given effective spectral transmission function of the optical unit, a predetermined angular code being defined by the effective spectral transmission function, such that said optical unit applies an angular coding, defined by the effective spectral transmission function, to an input light field while being imaged onto an imaging plane defined by a pixel array of a detector located in a back focal plane of the imaging lens module; a controller configured and operable to sequentially modify the effective spectral transmission function of the optical unit, to modify the angular coding applied to the input light field, such that image data generated by the detector is indicative of sequentially acquired frames with different angular coding of the input light field; and a data processor configured and operable to process the image data utilizing data indicative of the different angular coding applied in said sequentially acquired frames and generating reconstructed spectral data of the object being imaged.

20. A method for use in reconstructing spectral data of an object being imaged, the method comprising:

performing one or more optical imaging sessions, each optical imaging session comprising creating an image of an input light field originated in a region of interest in an imaging plane defined by a pixel array while applying to said input light field being imaged a predetermined angular coding, such that detected light intensity at the pixel corresponds to spectral data in the image created during the imaging session multiplexed with the predetermined angular coding; and processing data indicative of the detected light intensity in each of said one or more imaging sessions, utilizing the predetermined angular coding, and determining the spectral data of the object.

* * * * *